March 22, 1949.    M. ROSS    2,464,993
SHREDDING MACHINE
Filed Dec. 19, 1945
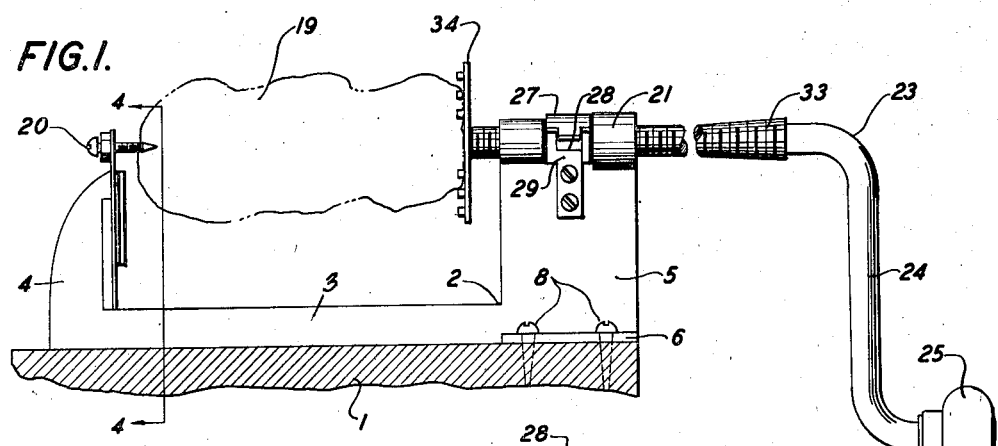
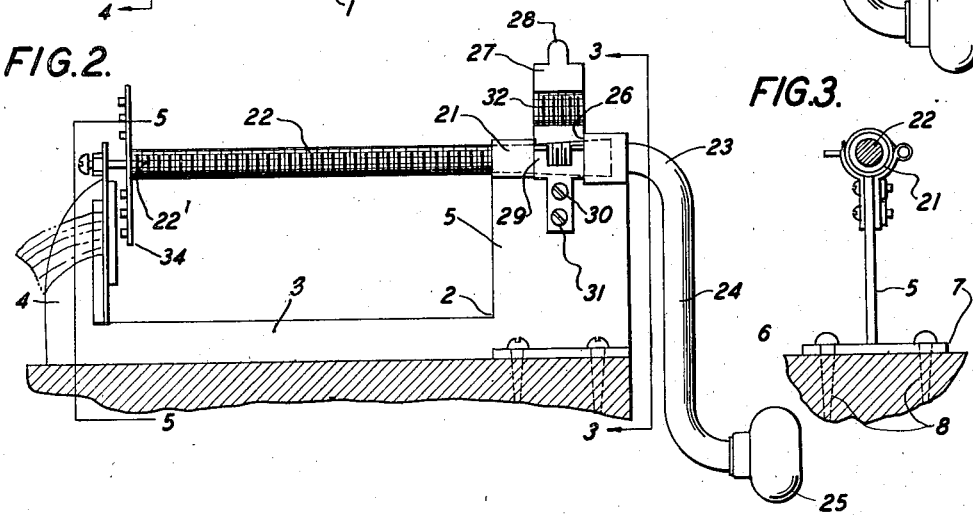
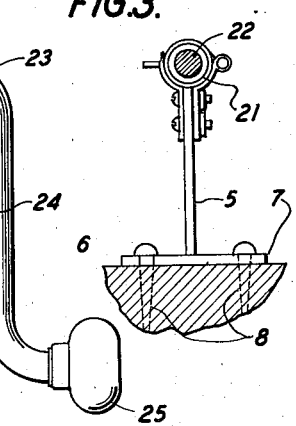
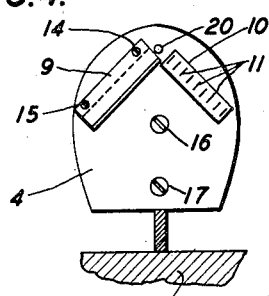
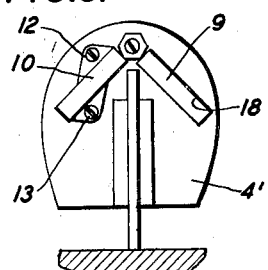
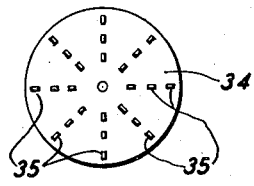
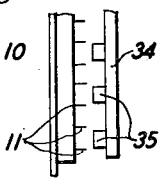
INVENTOR.
MARK ROSS
BY Earl E. Moore
ATTORNEY Patented Mar. 22, 1949

2,464,993

UNITED STATES PATENT OFFICE 2,464,993

SHREDDING MACHINE

Mark Ross, Los Angeles, Calif.

Application December 19, 1945, Serial No. 635,973

1 Claim. (Cl. 146—164)

This invention relates to a device, as well as means and ways, for shredding and stringing potatoes and the like. The device can be used for shredding certain kinds of vegetables and/or fruits, but at present the public wants shoe string potatoes and the device of this invention is especially constructed and arranged to make perfect shoe string potatoes in a quick and dependable manner. The device is so configurated and designed that any unskilled person can easily operate it, clean it, and maintain it in perfect order.

One of the principal objects of the invention is to present a new and novel means for shredding and/or stringing certain classes of vegetables and/or fruits, the device being simple to operate and to construct, and economical to make and manufacture.

Another object is to provide a shredding and stringing machine that has fixed cutters that can be made adjustable, and a positive lath-like feed means for rotating the vegetables or fruits to be shredded, means also being provided to release the positive feeding means when the vegetables or fruits are cut to their very end.

Other objects, advantages and features of my invention will appear from the accompanying drawings, the subjoined detailed description, the preamble of these specifications and the appended claim.

Applicant is about to illustrate and describe one of the forms of his invention in order to teach one how to make and use the same, but it is to be understood that the drawings and description thereof are not to limit the invention in any sense whatsoever, except as limited by the appended claim.

In the drawings:

Fig. 1 is a side elevational view of the invention showing it screwed to a table top or the like, and having a large potato in position for the shredding operation, Fig. 2 is a view similar to that of Fig. 1, but showing certain parts thereof in different positions.

Fig. 3 is a vertical view taken substantially along the line 3—3 of Fig. 2,

Fig. 4 is a vertical view taken substantially along the line 4—4 of Fig. 1,

Fig. 5 is also a vertical view taken substantially along the line 5—5 of Fig. 2, Fig. 6 is an elevational view of a feed plate employed in the invention, Fig. 7 is a side elevational view, enlarged, showing the feed plate against one of the cutter units.

The reference character 1 indicates a table or bench, or any suitable thing upon which to screw or bolt the frame 2 of the device. The frame is U-shaped and has the base bar 3 which is integral with the end upright members or arms 4 and 5, as shown. The extending flanges 6 and 7 on each side of the bar have holes to accommodate the wood screws 8, these screws securely holding the device in place so as to make it unnecessary to employ one hand to hold the device while the other hand is rotating the crank thereof.

The plate-like member 4' is the means for supporting the cutters; the cutter units being indicated by the numerals 9 and 10. Two of these units are sufficient for the purposes of the machine, but other such units may be employed if so desired. The unit 9 may be called the final slicer unit and the unit 10 the initial shredder unit, as the shredder unit is provided with a plurality of short knives or blades 11 which cut into the vegetable, for instance a potato, along a radius extending from the rotation axis of the thing being shredded; the blades of this unit slicing the potato into endless strips, the number thereof in this particular machine being eight should the potato be of great enough diameter to employ all the blades on the unit. The other unit 9 is just a single knife set at a bias with respect to the plane of the plate 4 and extends inwardly and cuts the thing or potato along a radial plane, the depth of the cut preferably being equal to the distance between any adjacent two of the blades or cutters 11. Both cutter units are removable for renewal purposes or for sharpening purposes, the unit 10 being held to the plate 4 by the machine screws 12 and 13, and the unit 9 is held to the plate by the machine screws 14 and 15, as shown. The plate 4' is fixed to the member 4 by the machine screws 16 and 17. A rectangular opening 18 is provided in alinement with the cutter 9 to provide an exit for the cuttings. To support and provide an axis for the thing to be shredded, such as the potato indicated at 19 in Fig. 1, a pointed stud 20 is fixed to the plate 4' which may be adjustably fixed thereto by providing the stud with screw threads so that it can be screwed into a tapped hole of the plate and provide a stop for the feeder plate.

The other arm or member 5 of the device is provided with a bearing sleeve 21 that has a smooth bore which is just large enough to neatly receive the running shredded portion 22 of a crank element 23, this element having the handle portion 24 and a pivoted finger grip knob 25. The bearing sleeve has an open portion 26 which has pivoted to one side thereof a stem engager element 27 that has a finger lift or tab 28. A ribbon spring type latching means 29 is provided which is fixed to one side of the arm or member 5 by the machine screws 30 and 31. The stem engager element has its inner surface shaped to snugly receive the threaded stem 22, the curved surface of which is provided with a threaded portion 32 which is adapted to engage the threads on the stem and cause the stem 22 to make positive forward progress toward the plate 4' when the handle 24 is rotated. The rear end portion of the threaded stem 22 is provided with enlarged threads 33, the purpose of these enlarged threads is to force the thread engager element 27 to automatically release itself from the stem 22 when it has reached the end of its stroke, that is, when the end of the stem is at or against the point of the stud 20. By thus releasing the stem, the stem can be easily and quickly drawn back from the plate 4' by a sliding action.

A feed plate 34 is fixed rigidly to the end 22' of the shaft or stem 22 which may be done by providing a threaded female bossed portion on the stem side of the plate and which is engaged by the end 22' of the stem 22. This plate is provided with a plurality of tooth-like elements 35 arranged in radial rows, as shown, which are designed to enter an end of the thing to be threaded, for instance the potato 19, and hold it against slippage so that the thing is forced to rotate when the handle 24 is rotated.

The pitch of the threads on the feeding element is such that a complete revolution thereof moves the feeding plate just ¼". The cutter blade 9 is positioned so that the cutting edge thereof is just $\frac{1}{32}$ from its supporting plate. It was discovered that the cutting edge need be only $\frac{1}{32}$ larger in order to make the device operate most satisfactorily. Note that the blades 11 and the tooth-like elements 35 are so spaced that the elements 11 can freely pass between the blades when they pass in the same vertical plane.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claim.

Having thus described my invention, what is claimed as new and desired to be secured by Letters Patent is:

In a device for cutting elongated strings from an article of food, a base having an upstanding arm member at each end thereof which members are in parallelism, one member having a fixed plate with a pair of spaced apart cutting blade elements thereon, one of the elements comprising a slightly slanted elongated blade having a cutting edge spaced a predetermined distance from the fixed plate and the other element having a plurality of evenly spaced apart projecting blades which are substantially normal to the face of the fixed plate, the other arm member having a sleeve with an open top portion having a cover hinged to an edge thereof, the axis of the sleeve being normal to the face of the fixed plate, a stem having a running thread thereon passing through the sleeve and adapted to be worked to and from the fixed plate, an under portion of the cover having a curved portion with portions of threads thereon which can mesh with the threads on the stem, a feeder plate on one end of the stem having a plurality of tooth-like projections thereon facing toward the fixed plate and crank means fixed to the other end of the stem, means for latching the cover in mesh with the stem, said means for latching the cover acting to hold the cover raised when not engaged to hold the cover down on the threads of the stem, the crank end of the stem having its threads enlarged radially to automatically release the cover from its latched position when the feeder plate nearly touches the fixed plate.

MARK ROSS.

REFERENCES CITED

The following references are of record in the file of this patent:

UNITED STATES PATENTS

| Number | Name | Date |
| --- | --- | --- |
| 204,895 | Harrington | June 18, 1878 |
| 1,568,786 | Wickop | Jan. 5, 1926 |
| 1,728,843 | Trunz | Sept. 17, 1929 |
| 1,891,997 | Moore | Dec. 27, 1932 |
| 1,954,165 | Yeomans | Apr. 10, 1934 |
| 2,012,507 | Gustin | Aug. 27, 1935 |
| 2,026,691 | McArdle et al. | Jan. 7, 1936 |